(12) United States Patent
Sugimoto

(10) Patent No.: US 6,437,948 B1
(45) Date of Patent: Aug. 20, 2002

(54) DISK UNIT HAVING A HEAD SUSPENSION

(75) Inventor: Masaharu Sugimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/651,686

(22) Filed: Aug. 30, 2000

(30) Foreign Application Priority Data

Dec. 21, 1999 (JP) .......................................... 11-363024

(51) Int. Cl.7 ................................................. G11B 5/60
(52) U.S. Cl. .................................................. 360/294.7
(58) Field of Search ........................... 360/294.7, 294.2, 360/294.4

(56) References Cited

U.S. PATENT DOCUMENTS 6,178,157 B1 * 1/2001 Berg et al. ................ 360/294.7
6,297,937 B1 * 10/2001 Schar ....................... 360/294.7
6,307,719 B1 * 10/2001 Mallary ................... 360/294.7

* cited by examiner

Primary Examiner—Robert S. Tupper
(74) Attorney, Agent, or Firm—Greer, Burns & Crain, Ltd.

(57) ABSTRACT

The present invention provide a disk unit having a head suspension which includes a disk for storage of information, a head for writing and/or reading information on the disk, a driving unit for moving the head radially between an area above the disk and an area outside the outer periphery of the disk, and a head suspension for supporting the head and applying force to the head in a direction substantially vertical to the surface of the disk. The head suspension includes a first beam having a free end at which the head is mounted and a proximal end opposite to the free end, a second beam arranged in opposed position to the first beam and having two ends, one end thereof positioned on the side of the free end of the first beam and fixed to the first beam, the other end thereof spaced apart form the first beam, and a moving means for moving the first beam and the second beam relative to each other in a longitudinal direction.

10 Claims, 4 Drawing Sheets

DISK UNIT HAVING A HEAD SUSPENSION

BACKGROUND OF THE INVENTION

1. Field of the Invention

The present invention relates to a disk unit, having a head suspension, for supporting a head for writing and/or reading information on a disk.

2. Description of the Related Art

A head suspension, which is generally used in a disk unit such as a floppy disk drive unit or a magnetic disk unit, includes a support beam, a spacer, and a gimbal. The gimbal is formed with more flexibility than that of the support beam and is mounted on one end (free end) of the support beam. On the surface of the gimbal is mounted a magnetic head slider, which is provided with a magnetic head for writing and/or reading information. The spacer is formed with a boss and is mounted on the other end of the support beam. The head suspension is connected to a carriage arm of the disk unit through the boss.

When a driving force from an actuator such as a voice coil motor is transmitted to the carriage arm, the head suspension supporting the head slider thereon is driven via the carriage arm so that the head of the head slider can write and/or read information data on a magnetic disk (storage medium) having a magnetic thin film on its surface.

A spring force (an urging force) applied by the support beam of the head suspension urges the head slider toward the surface of the disk, while a flying force or floatation force (positive pressure), generated by an air flowing between the surface of the disk and the surface of the head slider during rotation of disk, is exerted on the head slider to move it away from the surface of the disk. The balance of these two forces, the spring force and the flying force, results in the head slider flying above the disk with a gap (typically, 20 nm) between the surface of the disk and the surface of the head slider.

Recently, an increased storage capacity has been required of a disk unit having such the head suspension. This requires a decreased gap between the surfaces of the disk and the head slider for writing data on the disk with a higher density. As mentioned above, the gap between the surfaces of the head slider and the disk (i.e., the flying height) depends upon the balance of the spring force applied by the head suspension and the flying force (positive pressure) generated by the air flowing between the surfaces of the disk and the head slider. Therefore, the spring force applied by the head suspension should be increased in order to decrease the gap. On the other hand, an increased spring force often leads to an increased risk of damage to the surface of the disk or the head slider when the head slider happens to contact with the disk. Therefore, it is desirable to make the spring force as small as possible.

In order to achieve a small flying height under such small spring force, a negative pressure slider has been developed. This negative pressure slider generates a negative pressure, acting in a direction opposite to the flying force (positive pressure), between the slider and the disk by utilizing a diffuser effect, and thereby makes it possible to obtain a smaller gap (flying height) between the surfaces of the slider and the disk under small spring force.

In the case of using the negative pressure slider, it is generally required to maintain the gap between the surfaces of the slider and the disk smaller than the predetermined distance. This is because there is a limiting distance at which the negative pressure slider does not generate negative pressure. Thus, in vicinity of this limit distance, the negative pressure slider has a bistable flying characteristic, i.e., a characteristic which allows the slider to be stable in two different flying height, i.e., one flying height where there is a balance between the spring force and the flying force generated by positive pressure and the other flying height where there is a balance among the spring force, the acting force generated by the negative pressure, and the flying force generated by positive pressure. Therefore, in the use of the negative pressure slider, in order to avoid this bistable flying state, it is typical that a spring force from the head suspension must be adjusted in response to a distance between the surface of the disk and the position of the head suspension mounted to the carriage arm so as to obtain a sufficient spring force to maintain the negative pressure slider and the disk in a distance closer than a distance which ensures the generation of a negative pressure between them.

In a hard disk unit, if the rotation of a disk is stopped, a magnetic head slider will not receive a flying force (positive pressure) and will contact the surface of the disk. Therefore, it is required to protect a ring-shaped data zone of the disk, for data to be recorded, from the head slider when the disk is not rotated. One way of protecting the data zone is to take the head slider out of the data zone when the disk is not rotating. Suitable mechanisms are divided into two major types; a CSS (contact start stop) type and a ramped loading type. Recently, the ramped loading type mechanism has been used in many cases.

The ramped loading type mechanism includes a loading bar at the tip of the head suspension. When the disk is not rotating, the head suspension is moved such that the loading bar can ride over a ramp located outside the outer periphery of the disk. This makes the head slider move away from the surface of the disk (unload) and allows it to escape from the data zone of the disk to the outside of the disk. On the other hand, after the disk starts rotating, the head suspension is moved such that the loading bar can move down from the ramp. This makes the head slider move close to the surface of the disk (load) and allows it to move to the data zone of the disk.

In loading, a spring force from the head suspension is balanced with a reaction force from the surface of the ramp while the loading bar at the tip of the head suspension is positioned on the surface of the ramp. However, the reaction force is not exerted on the loading bar after the loading bar is detached from the ramp. Thus, at the moment the loading bar is detached from the ramp, the distal end of the head suspension is moved toward the surface of the disk, in a short time, by its own spring effect. This causes a problem of vibration of the head suspension. This vibration of the head suspension may result in the head slider contacting the surface of the rotating disk because of the temporarily decreased flying height of the head slider mounted on the distal end of the head suspension.

Moreover, since a greater rotation speed of the disk generates a greater level of impact energy at the contact of the head slider with the disk, the loading of the head slider at the outer area (the area near to the outer periphery) of the disk produces a greater level of impact energy. Thus, a disk unit that employs a ramped loading type mechanism, in which the head slider loads to the disk at its outer area, suffers from the risk that the contact of the head slider with the disk causes fatal damage to both devices.

SUMMARY OF THE INVENTION

An object of the present invention is therefore to reduce the vibration of a head suspension occurring on loading of a head slider to a disk while decreasing a level of impact energy generated by the contact of the head slider with the disk and thereby reducing the risk of causing damage to the disk and to the head slider.

To achieve the object, the present invention provides a disk unit having a head suspension which can load a head slider to a disk after moving the head slider to an inner area (an area adjacent to the center) of the disk.

In accordance with a first aspect of the present invention, there is provided a head suspension of a disk unit adapted for supporting a head for writing and/or reading information on a disk mounted in the disk unit and applying force to the head in a direction substantially vertical to the surface of the disk, which includes a first beam having a free end for the head to be mounted at and a proximal end opposite to the free end; a second beam arranged in opposed position to the first beam and having two ends, one end thereof positioned on the side of the free end of the first beam and fixed to the first beam, the other end thereof spaced apart from the first beam; and a moving means for longitudinally moving the first beam and the second beam relative to each other.

In accordance with a second aspect of the present invention, there is provided a disk unit which includes a disk for storage of information, a head for writing and/or reading information on the disk, a driving unit for moving the head between an area above the disk and an area outside the outer periphery of the disk, and a head suspension for supporting the head and applying force to the head in a direction substantially vertical to the surface of the disk. The head suspension includes a first beam having a free end for the head to be mounted at and a proximal end opposite to the free end, a second beam arranged in opposed position to the first beam and having two ends, one end thereof positioned on the side of the free end of the first beam and fixed to the first beam, the other end thereof spaced apart from the first beam, and an moving means for longitudinally moving the first beam and the second beam relative to each other.

This arrangement of the head suspension according to the present invention makes it possible to change the force applied to the head supported on the head suspension in the direction substantially vertical to the surface of the disk by longitudinally moving the first beam relative to the second beam. This change of the force applied to the head allows for adjustably changing the flying height of the head with respect to the surface of the disk.

Preferably, one of the proximal end of the first beam and the other end of the second beam includes a longitudinally movable end, which can move between a first position and a second position where the movable end is farthest away from the disk. More preferably, the head is moved between the area outside the outer periphery of the disk and the area above the disk while the movable end is moved so that the head is farthest away from the disk in a direction vertical to the surface of the disk.

In one preferred embodiment, the moving means is a piezoelectric element.

When the end of the first or second beam opposite to the free end of the first beam, i.e., the proximal end of the first beam or the other end of the second beam, is moved from the first position to the second position, its end positioned to the side of the free end of the first beam is moved so that the head mounted on the free end of the first beam is moved either upward or downward (in other words, the flying height of the head is changed due to the change of the force applied to the free end of the head suspension by the first beam and the second beam).

If the head is moved above the inner area of the disk while the head is farthest away from the disk in a direction vertical to the surface of the disk, the head can be loaded to the disk in its inner area. Since the rotation speed of the disk is slower in its inner area than in the outer area thereof, this inner loading can reduce the level of impact energy generated by the contact of the head with the disk and thereby reduce the degree of damage to the head and to the disk.

Preferably, the disk unit further comprises a negative pressure slider including the head and mounted on the free end of the head suspension and the negative pressure slider generates negative pressure between the surfaces of the disk and the negative pressure slider when the negative pressure slider comes closer to the disk than a predetermined distance.

The negative pressure slider has a bistable flying characteristic, that is, small movement of the negative pressure slider may greatly change the flying height of the head in the vicinity of the predetermined threshold of the flying height. Therefore, the small movement of the negative pressure slider allows for a great change in the flying height of the head, thereby reducing the risk of the head contacting the disk while the head moves to the inner area of the disk.

BRIEF DESCRIPTION OF THE DRAWING

The above and other objects, features, and advantages of the present invention will be made more apparent from the following description of the preferred embodiments thereof with reference to the accompanying drawings, wherein.

DESCRIPTION OF THE PREFERRED EMBODIMENTS

Figure 1:
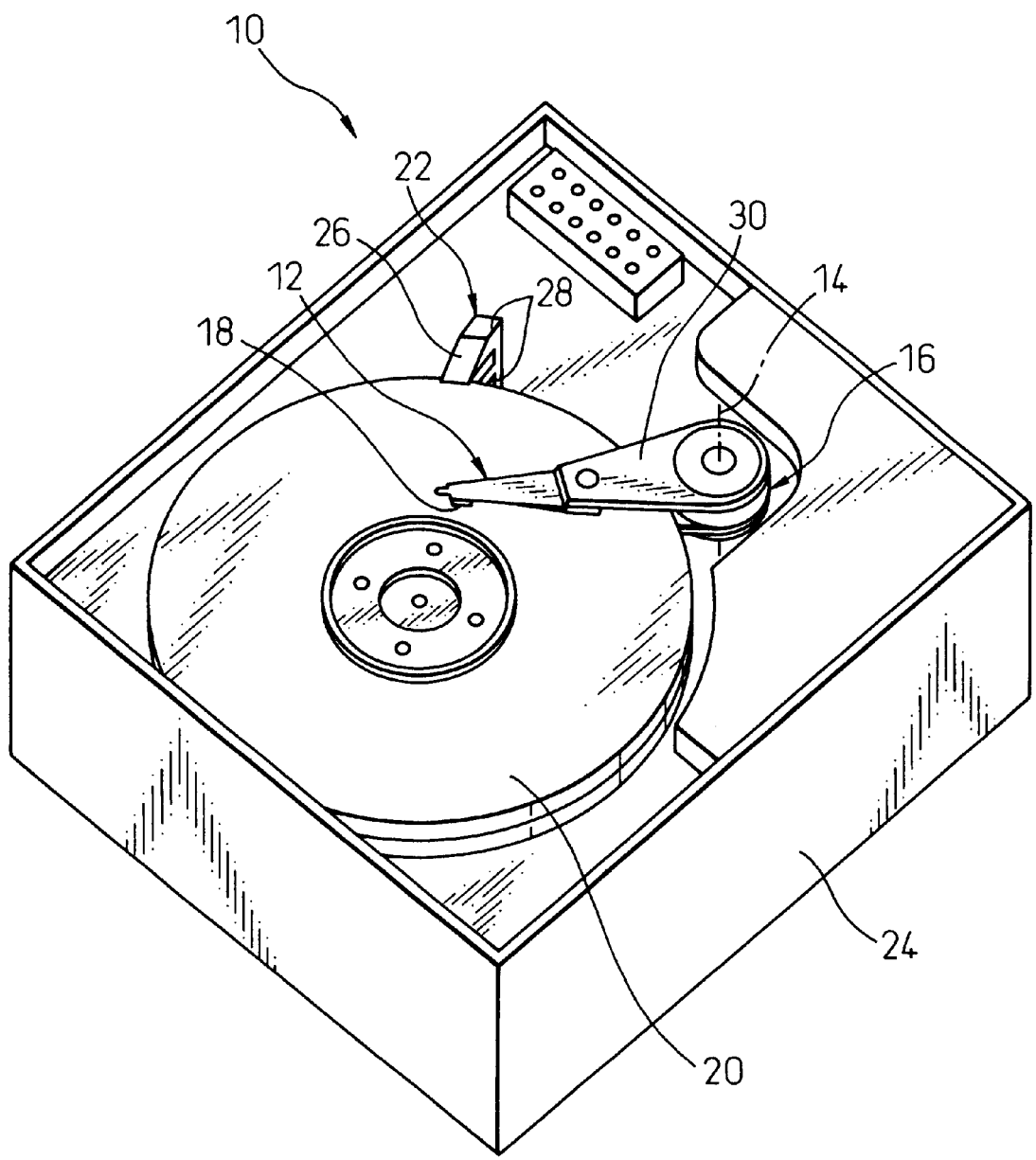
FIG. 1 is a perspective view illustrating a general construction of a disk unit having a pair of head suspensions, according to the present invention, opposing both sides of a disk.

FIG. 1 is a perspective view illustrating a general construction of a disk unit having a pair of head suspensions, according to the present invention, opposing both sides (upside and downside) of a disk (storage medium).

Referring to FIG. 1, a disk unit 10 according to the present invention includes a head suspensions 12, a driving unit 16 for supporting the proximal end of the head suspension 12 and swinging it about a rotation axis 14, a magnetic head slider 18 mounted on the distal end (the free end) of the head suspension 12, a disk (storage medium) 20 rotated by an actuator (not shown) such as a spindle motor, a ramp 22 arranged outside and adjacent to the outer periphery of the disk 20, and a housing 24 for accommodating these components.

The head slider 18 is opposed to the disk 20 with a small gap between their surfaces and is provided with a magnetic head able to write and/or read information (i.e., data) on the disk by way of magnetism. The ramp 22 includes a ramped portion having a ramped surface 26 and a horizontal portion having a horizontal surface 28. A part of the ramped portion projects radially and inwardly over the outer periphery of the disk but is not in contact with the surface of the disk 20. Particularly, the driving unit 16 further includes a carriage arm 30 for supporting the head suspension 12 and an actuator (not shown).such as a voice coil motor for swinging the head suspension 12 about the rotation axis 14 via the carriage arm 30.

In the disk unit 10 shown in FIG. 1, a pair of head suspensions 12, each of which is provided with a magnetic head slider 18 on the distal end (the free end) of the head suspension 12, are arranged on both sides of one disk 20. The head suspensions 12 are connected respectively through the carriage arms 30 to a single actuator, which drives the carriage arm 30 in common. It should be understood that the disk unit 10 of the present invention may include a plurality of disks 20 in order to increase its storage capacity and in this case a pair of head suspensions 12 supporting magnetic head sliders 18 are arranged on both sides of each of the disks 20. It should be also understood that in the case of using only one side of the disk 20 for data storage, only one head suspension 12 supporting the magnetic head slider 18 on its distal end must be arranged.

Figure 2:
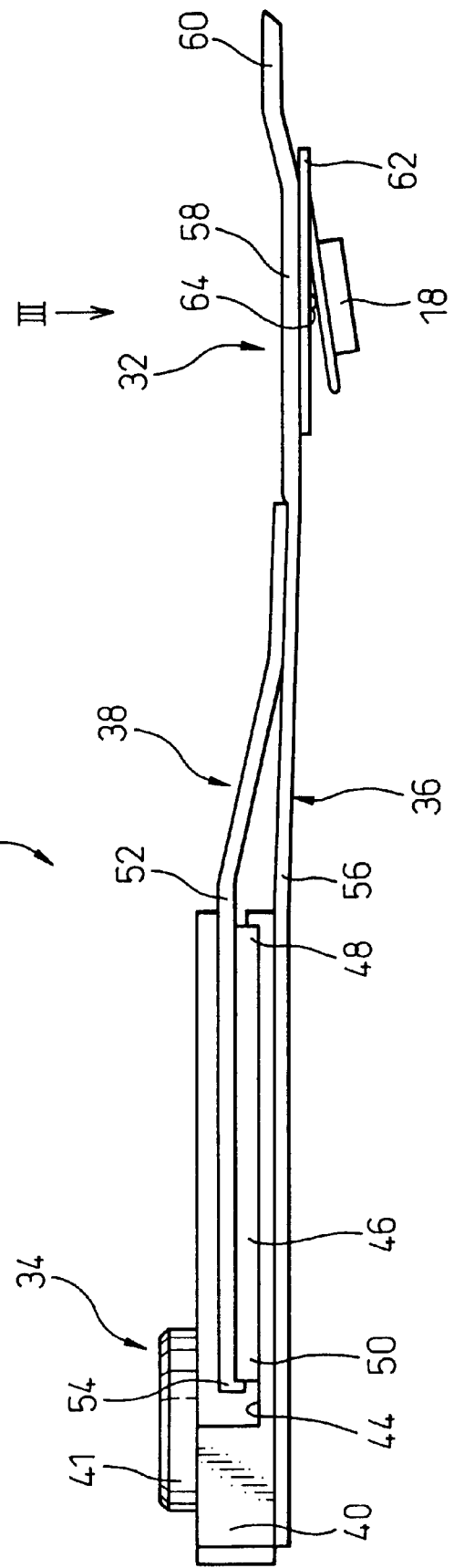
FIG. 2 is a side view of the head suspension shown in FIG. 1.
Figure 3:
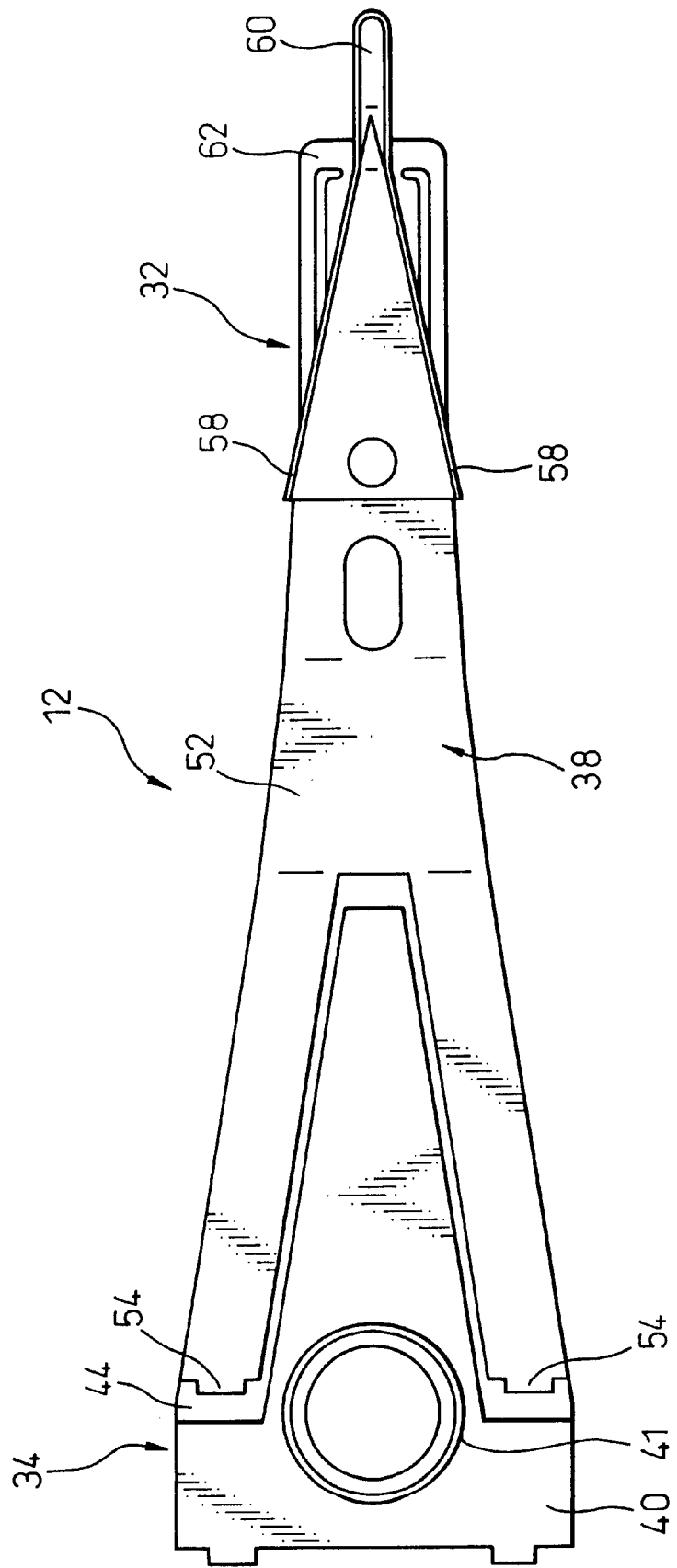
FIG. 3 is a plan view of the head suspension when seen in a direction indicated by an arrow III of FIG. 2.

FIG. 2 is a detailed side view of the head suspension 12 shown in FIG. 1, and FIG. 3 is a plan view of the head suspension 12 when seen in a direction indicated by an arrow III of FIG. 2. It should be noted that the thickness of each of the components is exaggerated for the purpose of explanation.

Referring to FIGS. 2 and 3, the head suspension 12 includes a distal end (free end) 32 opposing the disk 20, a proximal end 34 positioned on the side of the driving unit 16 opposite to the distal end 32, and first and second connections 36, 38 for connecting the distal end 32 and the proximal end 34.

The proximal end 34 consists of a spacer 40 formed with a boss 41 projecting in a direction of thickness. The head suspension 12 is connected to the carriage arm 30 of the driving unit 16 through the boss 41. In the edge portion of the spacer 40 is formed a V-shaped recess 44, in which a piezoelectric element 46 is located as a moving means. Only one end of the piezoelectric element 46 is fixed so that the piezoelectric element 46 can expand and contract in the recess 44. In the embodiment shown in FIGS. 2 and 3, one end 48 of the piezoelectric element 46 positioned on the side of the distal end 32 of the head suspension 12 is fixed to the spacer 40, while the other end 50 thereof positioned on the side of the proximal end 34 of the head suspension 12 is defined as a free end.

A top plate (or top beam) 52 is mounted on the top of the piezoelectric element 46 and extends to the distal end 32 of the head suspension 12. One end of the top plate 52 is formed in a V-shape corresponding to the shape of the recess 44. Further, each of two tips of the V-shaped end is formed with an L-shaped attachment 54. Both of two L-shaped attachments 54 of the top plate 52 are coupled to the free end of the piezoelectric element 46. Thus, the top plate 52 can move longitudinally toward the proximal end 34 of the head suspension 12 by expanding the piezoelectric element 46 in the recess 44.

A bottom plate (or bottom beam) 56 is fixedly coupled to the bottom of the spacer 40 and extends to the distal end 32 of the head suspension 12 in opposed relationship to the top plate 52. The top plate 52 and the bottom plate 56 overlap on their ends opposite to the spacer 40 and are jointed together with each other to form a part of the distal end 32 of the head suspension 12 as one plate.

The head suspension 12 is also provided with a rib 58 for improving its rigidity on the periphery of the distal end 32 and with a loading bar 60 at the tip thereof. When the loading bar 60 contacts the ramped surface 26 of the ramp 22 and moves along it, the distal end 32 of the head suspension 12 moves vertically with respect to the surface of the disk 20 to load or unload the magnetic head slider 18 to or from the disk 20.

A gimbal 62 is mounted on the distal end 32 of the head suspension 12 and the magnetic head slider 18 is also mounted on the surface of the gimbal 62. The gimbal 62 is of a well-known type and will not be described herein in detail. The surface of the distal end 32 of the head suspension 12 is formed with a pivot 64 positioned beneath the gimbal 62. The head slider 18 mounted on the gimbal 62 can pivot about the pivot 64. In other words, the pivot 64 allows the head slider 18 to follow the movement of the disk 20 and thereby to maintain a predetermined flying position with respect to the surface of the disk 20.

In the head suspension 12 having such construction, the second connection 38 defined by the top plate 52 and the first connection 36 defined by the bottom plate 56 extend in vertical alignment to connect the distal end 32 and the proximal end 34. Such first and second connections 36, 38 together form a spring portion which can apply a spring force to the head slider 18 mounted on the distal end 32 of the head suspension 12 by its elasticity, thereby urging the head slider 18 toward the surface of the disk 20. In other words, the spring portion functions as a leaf spring.

Thus, pulling forces applied to the distal end 32 of the head suspension 12 by the first and second connections 36, 38 contain a force component in a direction vertical to the surface of the disk 20 and thereby urge the distal end 32 toward the surface of the disk 20. Therefore, if the disk unit 10 includes an adjusting means for adjustably changing the pulling forces applied to the distal end 32 of the head suspension 12 by the first and second connections 36, 38, the force component of the spring force, in a direction vertical to the surface of the disk 20, applied to the distal end 32 of the head suspension 12 can be adjustably changed.

In the embodiment shown in FIGS. 2 and 3, the second connection 38 defined by the top plate 52 is forced or moved toward the proximal end 34 of the head suspension 12 by the expansion of the piezoelectric element 46, which functions as a adjusting means for adjustably changing the spring force. The expansion of the piezoelectric element 46 results in the change of the spring force applied to the distal end 32 of the head suspension 12 and makes it possible to adjustably reduce the spring force of the whole spring portion. If the piezoelectric element 46 is expanded to larger degree, the distal end 32 of the head suspension 12 can even be moved away from the surface of the disk 20.

In the head suspension 12 according to the present invention, one of the first and second connections 36, 38 may adjustably change the pulling force applied to the distal end of the head suspension 12. Thus, the piezoelectric element 46 forces the proximal end of the second connection 38 toward the proximal end 34 of the head suspension 12 in the embodiment shown in FIGS. 2 and 3, although it should be understood that the piezoelectric element 46 may force the first connection 36 toward the proximal end 34 in a longitudinal direction thereof. Further, the first connection 36 or the second connection 38 may include the piezoelectric element 46 in the middle thereof, or may consist of the piezoelectric element 46. Instead of the piezoelectric element 46, any other suitable moving means for longitudinally moving the top plate 52 and the bottom plate 56 relative to each other thereby forcing the first or second connection 36, 38 also may be used such as a micromotor, an electromagnet, or another means. The distal end 32, the proximal end 34, the first connection 36, and the second connection 38 may be constituted by separate members.

Figure 4:
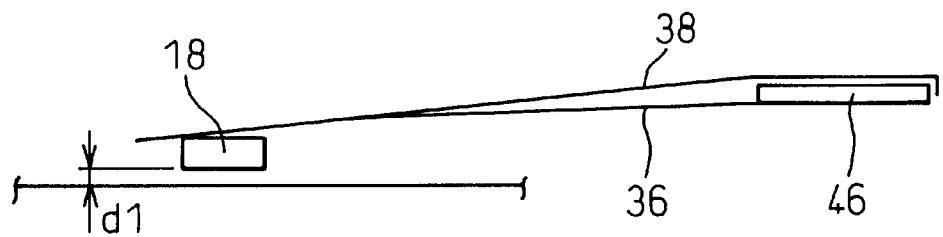
FIG. 4 is a diagrammatic view showing a position of a magnetic head slider mounted on the distal end of the head suspension relative to the surface of the disk when a spring force from the head suspension is strengthened.
Figure 5:
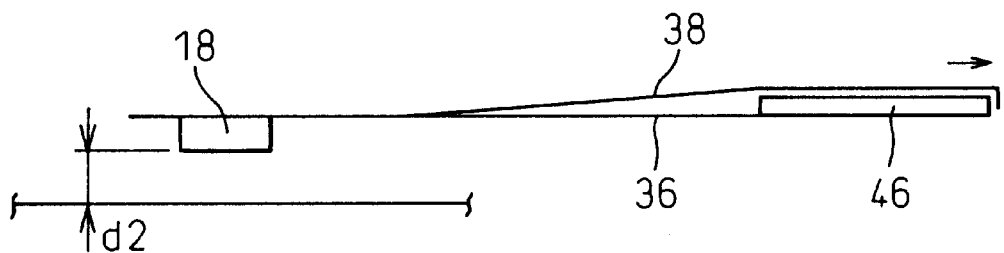
FIG. 5 is a diagrammatic view showing a position of the head slider relative to the surface of the disk when a spring force from the head suspension is weakened.
Figure 6:
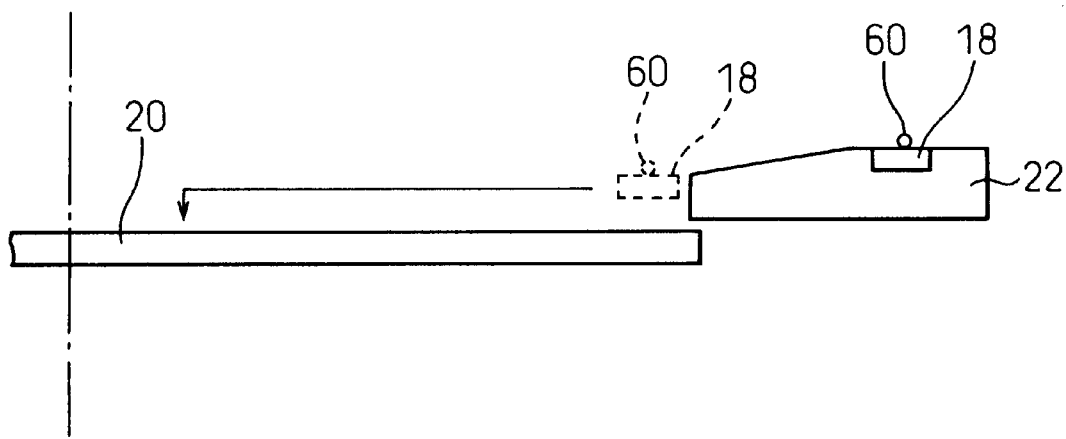
FIG. 6 is a diagrammatic view illustrating the operation of the loading of the head slider in a ramped loading type disk unit according to the present invention.

Referring to FIGS. 4–6, the operations of the head suspension 12 will be described below.

Two forces are applied to the head slider 18; the flying force applied away from the surface of the disk 20 (positive pressure) and the spring force applied toward the surface of the disk 20 by the head suspension 12. In the case of using a negative pressure slider as the head slider 18, a negative force generated by negative pressure between the surfaces of the head slider 18 and the disk 20 is applied to the head slider 18 toward the surface of the disk 20. Thus, the flying height of the head slider 18 depends upon the balance of these forces.

By expanding and contracting the piezoelectric element 46 longitudinally, the head suspension 12 according to the present invention can adjustably change the pulling force applied longitudinally to the distal end 32 of the head suspension 12 by one of the first connection 36 or the second connection 38, thereby changing the spring force of the head suspension 12 urging the distal end 32 toward the surface of the disk 20 to adjust the flying height of the head slider 18.

In the embodiment shown in FIGS. 2 and 3, when the piezoelectric element 46 is contracted and the spring force and spring modulus of the head suspension 12 are increased, the flying height of the head slider 18 is decreased as shown in FIG. 4. At this time, the flying height, i.e., the distance between the opposing surfaces of the disk 20 and the head slider 18, is presented by d1 in FIG. 4.

On the other hand, when the piezoelectric element 46 is expanded and the spring force and spring modulus of the head slider 18 are decreased, the flying height of the head slider 18 is increased as shown in FIG. 5 because the spring force is decreased for the same flying force. At this time, the flying height is presented by d2 (>d1) in FIG. 5.

In the case of using a negative pressure slider, the difference between the flying height under a smaller spring force and the flying height under a larger spring force is increased by utilizing a bistable flying state, which has been avoided in the prior art. Increased spring force of the head suspension 12 results in decreased flying height of the slider 18, which can generate negative pressure forcing the slider 18 toward the surface of the disk 20 and thereby further decrease the decreased flying height d1 to a smaller distance (flying height) d1' (<d1). Conversely, decreased spring force results in increased flying height d2, which cannot generate negative pressure between the slider 18 and the disk 20. Therefore, in this case the distance between the surfaces of the slider 18 and the disk 20 is maintained at d2. Thus, the difference of the negative pressure slider between the flying height under a smaller spring force and the flying height under a larger spring force becomes larger than that of the normal slider.

Referring to FIG. 6, the operation of the disk unit 10, utilizing features of the head suspension 12 of the present invention, will be described below.

It should be noted that, in the following description, a higher vertical position of the magnetic head slider 18 where the distance between the head slider 18 and the disk 20 is d2 is referred as a first higher position, and that a lower vertical position of the head slider 18 where the distance is d1 or d1, is referred as a second lower position.

In conventional ramped loading type disk units, a head slider is loaded near the periphery of the disk from an area outside the disk to an area inside the disk. When a loading bar located at the tip of a head suspension moves away from a ramp, a magnetic head slider mounted on the head suspension moves toward the surface of the disk. At this time, the head slider can vibrate and thereby contact the disk.

In contrast to this case, in the disk unit 10 having the head suspension 12 according to the present invention, when the head slider 18 is loaded to the disk 20, at first it moves from the ramp 22 toward the area inside the disk 20 while being at a first position obtained by expanding the piezoelectric element 46 in a longitudinal direction thereof to decrease spring force of the head suspension 12, as shown in FIG. 6. Since the head slider 18 is at a large flying height at this time, it can move from the outer area of the disk 20 to the inner area thereof without being in contact with the disk 20. After the head slider 18 is moved above the inner area of the disk 20, the flying height of the head slider 18 is decreased by longitudinally contracting the piezoelectric element 46 to increase the spring force of the head suspension 12. This moves the head slider 18 to the second lower position where the head slider 18 can be loaded to the disk 20.

When the head slider 18 is unloaded from the disk 20, it is moved, in reverse, to the inner area of the disk 20 and then the flying height of the head slider 20 is increased by longitudinally expanding the piezoelectric element 46 to decrease the spring force of the head slider 18. This moves the head slider 18 away from the surface of the disk 20 to the first higher position where the flying height is higher than that in the second lower position. The head slider 18 is then moved to the outer area of the disk 20 along with the head suspension, while maintaining the first higher position, so that the loading bar 60 at the tip of the head suspension 12 is carried on the ramp 22 located outside the outer periphery of the disk 20.

The loading of the head slider 18 in the inner area of the disk 20 may decrease a level of impact energy generated by the contact of the head slider 18 with the rotating disk 20, because the rotation speed is smaller in the inner area of the disk 20 than in the outer area thereof. Therefore, the loading or unloading of the head slider 18 in the inner area of the disk 20 generates a smaller level of impact energy when the head slider 18 contacts the disk 20, thereby reducing the risk of causing damage to the head slider 18 and to the disk 20.

The smooth changing of the head slider 18 from the first higher position to the second lower position during loading can reduce vibration occurring at the distal end 32 of the head suspension 12 and thereby reduce the risk of contacting the head slider 18 with the disk 20.

While the invention has been described with reference to specific embodiments chosen for purpose of illustration, it should be apparent that numerous changes and modifications could be made thereto by those skilled in the art without departing from the basic concept and scope of the invention as claimed in the accompanying claims.

What is claimed is:

1. A head suspension of a disk unit adapted for supporting a head for writing and/or reading information on a disk mounted in said disk unit and applying force to said head in a direction substantially vertical to the surface of said disk, said head suspension comprising:

a first beam having a free end for said head to be mounted at and a proximal end opposite to the free end;

a second beam arranged in opposed position to said first beam and having two ends, one end thereof positioned on the side of the free end of said first beam and fixed to said first beam, the other end thereof spaced apart from said first beam; and a moving means for longitudinally moving said first beam and said second beam relative to each other.

2. The head suspension according to claim 1, wherein one of the proximal end of said first beam and the other end of said second beam comprises a longitudinally movable end, said movable end being able to move between a first position and a second position where said movable end is farthest away from said disk.

3. The head suspension according to claim 1, wherein said moving means comprises a piezoelectric element.

4. A disk unit comprising a disk for storage of information, a head for writing and/or reading information on said disk, a driving unit for moving said head between an area above said disk and an area outside the outer periphery of said disk, and a head suspension for supporting said head and applying force to said head in a direction substantially vertical to the surface of said disk, wherein said head suspension comprises a first beam having a free end for said head to be mounted at and a proximal end opposite to said free end, a second beam arranged in opposed position to said first beam and having two ends, one end thereof positioned on the side of said free end of said first beam and fixed to said first beam, the other end thereof spaced apart from said first beam, and moving means for longitudinally moving said first beam and said second beam relative to each other.

5. The disk unit according to claim 4, wherein one of said proximal end of said first beam and said other end of said second beam comprises a longitudinally movable end, said movable end being able to move between a first position and a second position where said movable end is farthest away from said disk.

6. The disk unit according to claim 5, wherein said head is moved between the area outside the outer periphery of said disk and the area above said disk while said movable end is moved so that said head is farthest away from said disk in a direction vertical to the surface of said disk.

7. The disk unit according to claim 6, wherein said head is loaded to said disk in an inner area thereof.

8. The disk unit according to claim 4, wherein said moving means comprises a piezoelectric element.

9. The disk unit according to claim 4, wherein said disk unit further comprises a negative pressure slider including said head and mounted on said free end of said head suspension and wherein said negative pressure slider generates negative pressure between the surfaces of said disk and said negative pressure slider when said negative pressure slider comes closer to said disk than a predetermined distance.

10. A head suspension of a disk unit adapted for supporting a head for writing and/or reading information on a disk mounted in said disk unit and applying force to said head in a direction substantially vertical to the surface of said disk, the head suspension comprising an adjusting means for adjustably changing the force applied to the free end of said head suspension.

* * * * *

UNITED STATES PATENT AND TRADEMARK OFFICE
CERTIFICATE OF CORRECTION

PATENT NO.    : 6,437,948 B1
DATED         : August 20, 2002
INVENTOR(S)   : Masaharu Sugimoto It is certified that error appears in the above-identified patent and that said Letters Patent is hereby corrected as shown below:

Title page,
Item [57], ABSTRACT,
Line 1, delete "provide" insert -- provides --.
Line 14, delete "form" insert -- from --.

Signed and Sealed this

Twenty-fifth Day of March, 2003

JAMES E. ROGAN
*Director of the United States Patent and Trademark Office*